C. W. BEATTIE.
DISCHARGE VALVE FOR FLUSH TANKS.
APPLICATION FILED AUG. 21, 1919.

1,353,559.

Patented Sept. 21, 1920.
2 SHEETS—SHEET 1.

Inventor
Charles W. Beattie
by Wright, Brown, Quinby & Way
Attorneys

C. W. BEATTIE.
DISCHARGE VALVE FOR FLUSH TANKS.
APPLICATION FILED AUG. 21, 1919.
1,353,559.
Patented Sept. 21, 1920.
2 SHEETS—SHEET 2.
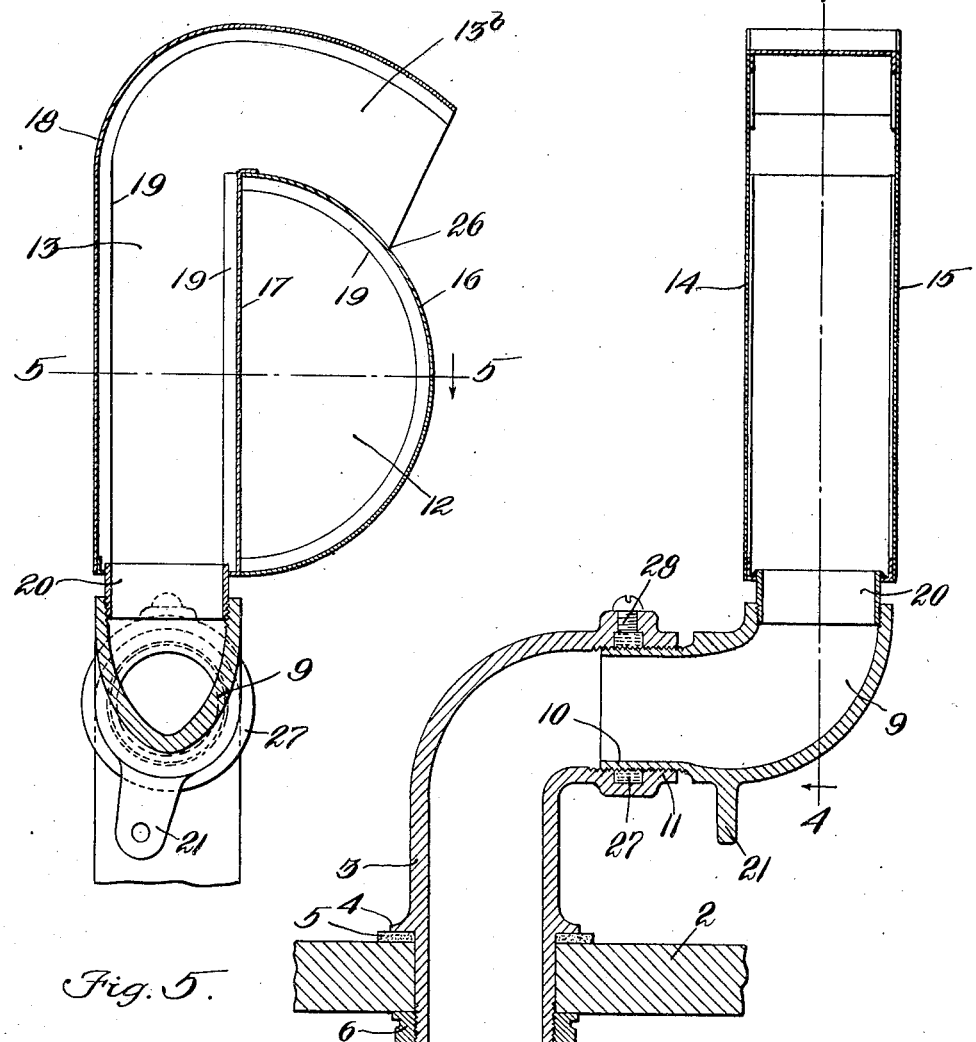
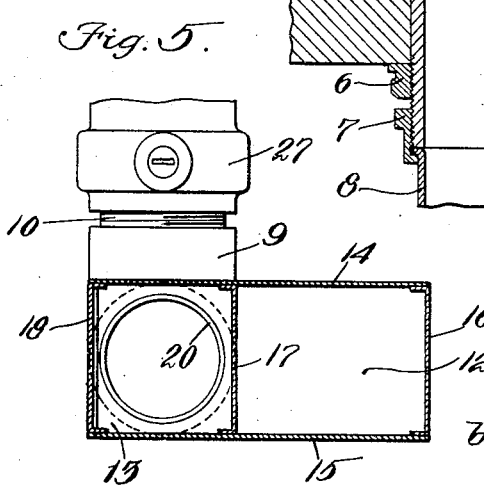
Inventor
Charles W. Beattie
By Wright, Brown, Quinby & Day
Attorneys

UNITED STATES PATENT OFFICE.

CHARLES WILLIAM BEATTIE, OF PARSONSFIELD, MAINE, ASSIGNOR OF ONE-HALF TO JOHN C. NICHOLSON, OF PEABODY, MASSACHUSETTS.

DISCHARGE-VALVE FOR FLUSH-TANKS.

1,353,559.   Specification of Letters Patent.   Patented Sept. 21, 1920.

Application filed August 21, 1919. Serial No. 318,903.

*To all whom it may concern:*

Be it known that I, CHARLES WILLIAM BEATTIE, a citizen of the United States, residing at Parsonsfield, in the county of York and State of Maine, have invented new and useful Improvements in Discharge-Valves for Flush-Tanks, of which the following is a specification.

My present invention has reference to flush tanks and the discharge valves thereof used in connection with waterclosets; that is, the valve in such a tank which is opened to permit flow of the water needed to flush the closet. Heretofore, various types of such valves have been devised and put to use, and all of such valves within my extensive knowledge leak more or less, if not when first installed, then at least after having been in use for a more or less extended length of time. The causes of leakage are various, including deterioration of the rubber or leather valves and valve packings, corrosion, or pitting of metal valve seats and valves by the water, and others. These causes are not important from the standpoint of the present disclosure, but what is important is the fact that valves of the sort indicated very commonly leak, and are a cause of expense through waste of water and on account of repairs and renewal that are necessary to keep them in use.

It is the purpose of this invention to prevent the leakage due to flush valves, and to avoid the trouble and expense occasioned by frequent repairs and replacements. I have done this by devising a new type of valve, which will not leak, even under the most severe conditions of use, and is of such simple design and so durable in construction that it may be used for extended periods of time without need of any repairs.

The manner in which I prefer to embody the invention to secure the objects which I have named, and other subsidiary objects which will appear from the following specification, is disclosed in the representation and description of an operative flush valve embodying the invention herewith presented.

In the drawings:

Fig. 3 is a cross section, taken on the line 3—3 of Fig. 1, but on an enlarged scale, showing details of construction of my device.

Fig. 4 is a section taken on the line 4—4 of Fig. 3.

Fig. 5 is a cross section taken on line 5—5 of Fig. 4.

Like reference characters designate the same parts in all of the figures.

I have called this device a flush valve or discharge valve, because it performs the function of discharging water from a flush tank which is performed by the valves heretofore used, but it is a valve only in that sense, and there all resemblance to prior discharge valves ceases; otherwise the device is not strictly a valve at all, since it has no valve seat and no valve body co-acting with a seat. Therefore the term "valve" as I have used it in this specification, is to be construed in the special sense as indicating a means for discharging the contents of a tank, and is not to be confused with valves of ordinary types.

Figure 1:
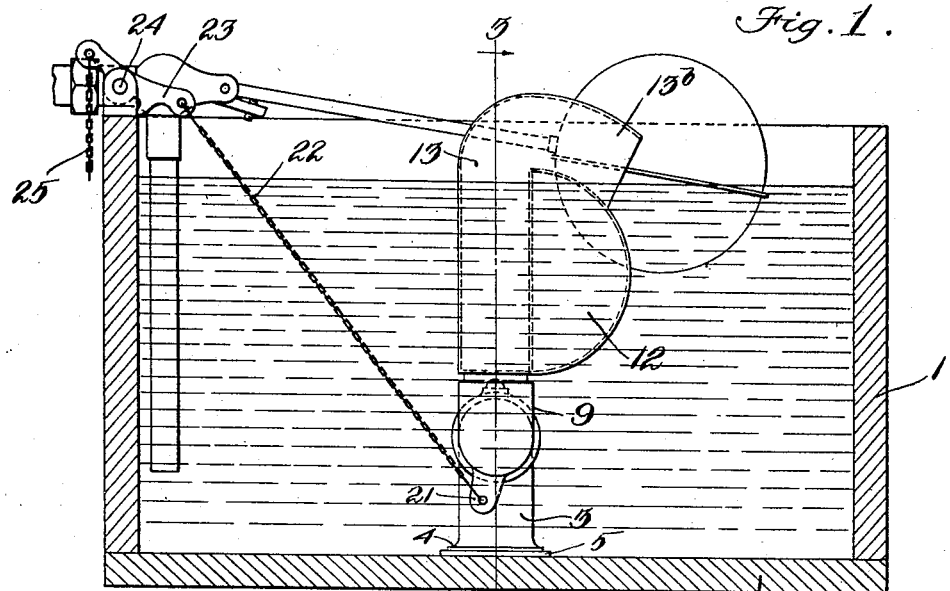
Figure 1 is a sectional view of a watercloset flush tank having my novel improved discharge valve therein, the tank being full.

In the drawings, Figure 1 represents a tank, which may be considered as typical of any watercloset flush tank, or, indeed, of any other container for liquid from which it may be desired at times to withdraw the contents. Through the bottom wall 2 of the tank passes the pipe fitting 3, having a flange 4 between which and the tank bottom is confined a packing washer 5, said fitting supporting a clamp nut 6 on that part which protrudes from the tank bottom. 7 is a coupling, connecting the fitting to a pipe 8, which conducts the water to the closet or other place of use.

The fitting 3 is an elbow fitting, having a right-angle bend. Hence, when applied to the tank bottom, as shown, the upper orifice of the fitting is in a vertical plane, and its axis is horizontal. Coupled to this fitting is a second elbow fitting 9, having a nipple 10, which is externally screw-threaded, and is meshed with internal threads in the end 11 of the fitting 3. The threaded engagement between these parts is so free that the part 9 may turn in the mouth portion 11 of the other fitting, with no serious resistance.

A combined float and siphon tube is connected to the elbow fitting 9. The float part of this combined structure is designated 12, and the siphon tube part thereof is designated 13 and partly embraces the float. This structure may be conveniently made of sheet metal, consisting of two wide side pieces 14, 15, an outer intermediate wall 16 forming all but one side of the float, a partition wall 17 forming the remaining side of the float and also one side of the siphon passage, and another outer wall forming the remaining side of the siphon passage. It happens that, in the particular construction shown, the float is semicylindrical and the siphon passage is square in cross section and forms a sharp bend through a right angle or more than a right angle. These are details which may be departed from, although I believe they embody the simplest and least expensive construction possible for this part. This whole structure is made of five pieces only, having either flat surfaces or simple curves, and without difficult joints. In fact, the walls 16, 17 and 18 may be made of strips of sheet metal of the desired width, having their edges turned up to form lips or flanges 19; and, being so made,—and the walls 16 and 18 being curved as required,—they may be placed between the side-plates 14 and 15 and secured by soldering. The wall 16, as made, extends across the end of the passage 13, but it is formed with an opening in line with such passage, in which is secured, by soldering or otherwise, a coupling or coupling ring 20, which is threaded, and is secured removably in the entrance end of the elbow fitting 9. These parts are thus arranged so that the float structure swings in a vertical plane about a horizontal axis, and it is placed so that it may move between one position wherein the conduit extends upwardly from the elbow fitting, and a second position wherein the conduit passes over the top of the float and downward at that side of the float which is more remote from the pipe fitting. The first of these positions is shown in Fig. 1, and the second in Fig. 2. When the tank is full of water, the buoyancy of the float makes the structure assume the first position. In this position, also, the conduit acts as an overflow, as is readily apparent from Fig. 1.

The fitting 9 has a lug or arm 21, to which is connected a chain 22, or equivalent tension-applying means. This chain is connected to the pull-chain of the closet, or to any other contrivance with which the closet may be fitted to cause discharge of the flushing water. As here shown, the chain is connected to one arm of a lever 23, pivoted on the fulcrum 24 on the flush tank, and the other arm of this lever is connected to a pull-chain 25; but this is only by way of illustrating a complete operative combination, without intent to indicate any limitation in the protection to which I make claim. Some types of flush tank are operated by other means than chains, and it is obvious that a connection may be made between the lug 21 and the operating handles or means of such tanks by expedients well understood by those skilled in the art. What I aim to set forth here is that means are provided in connection with the discharge valve for tilting the same from the position shown in Fig. 1 to that shown in Fig. 2.

Figure 2:
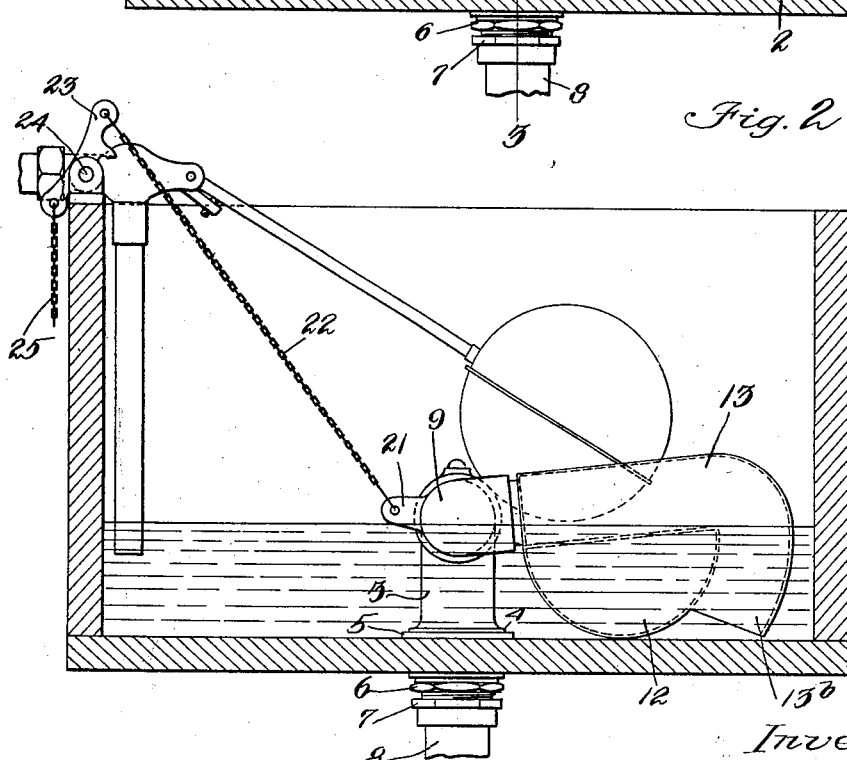
Fig. 2 is a similar view, showing the valve in the position given it for discharging the contents of the tank to flush a closet.

When it is necessary to discharge the tank, the chain is pulled, and thereby the device is overturned and submerged. The passage 13 at once fills and water flows therefrom, and through the pipe connections shown, to the place of use; and it continues to flow until the siphonic effect is broken by the surface of the water falling below the highest point of the entrance orifice to the conduit 13. In the construction shown, this highest point is at 26, where the sides of the conduit meet the wall 16. These sides may be made to extend farther out, or may be cut back to any extent, or be punctured anywhere desired, to control the level to which the water will be lowered when the flow ceases. Until the vacuum is broken by lowering of the water level, as described, the float will be held in the lowered position by the weight of the water held by suction in the descending leg of the conduit. The part just described as the descending leg is designated 13$^b$, and is that part of the conduit which passes over the top of the float when the latter is elevated, as in Fig. 1, and extends downward when the float is depressed, being wholly outside of the float, as shown in Fig. 2. This is an item of importance in the scheme of the invention, since it enables a predetermined amount of water in the tank to be discharged for flushing even to the extent of complete emptying; and it dispenses with the need of the operator maintaining a constant pull on the chain or other controller to keep the float in the discharging position until the required amount of water has been discharged. The desired object in this respect is accomplished if the content of water in the descending leg of the conduit is great enough to overbalance the buoyancy of the float.

When the vacuum is thus broken, the water leaves the descending leg of the conduit, and the float device is then raised by its buoyancy as inflowing water raises the level in the tank, until it reaches a substantially upright position again. In that position, the conduit serves as an overflow, limiting the possible height to which the water can rise, as clearly shown in Fig. 1.

This device is adapted to be used in connection with a float-controlled inlet valve of any desired character, and it may be so used in any flush tank of any of the usual shapes and sizes. The body of the valve, by which I mean that part which is set in the tank and to which the float contrivance is swiveled, may be put in any position and arrangement where the float device will not interfere with the ball float of the inlet valve; and, as the flush valve float is narrow in width and has flat sides, it is adapted to be placed close to a wall of the flush tank, where it will function properly without occupying any space needed for the movement of the inlet valve float. So, also, the body of the valve may have various forms and constructions, and, instead of being set into the bottom of the tank, it may be set in any of the side walls, and that part which projects into the tank may be straight, or may have a bend of any other angle than a right angle. In fact, it may have any construction which enables the float device to be swiveled to it with ability to swing about a horizontal axis, or an axis near enough to the horizontal to permit it to rise with the water in the tank and to be submerged in such water.

Another feature of the invention is the means for packing the swivel joint of the float device in a simple, efficient and frictionless manner. This packed swivel joint is shown in Fig. 3, and it consists first in complementally threading the coupled parts 10 and 11, whereby these parts may be readily assembled, and in a chamber 27 in the interior of the part 11 intermediate to the ends of the part 12, that is, the chamber 27 is flanked on both sides by threads, which are engaged with the swivel member 10. This chamber is filled with a water-repellant fluid, such as heavy cylinder oil or equivalent material. Equivalent to cylinder oil for this purpose is any fluid which will repel water, which will not escape between the complementally threaded parts but is fluid enough to follow the in and out movements of the fitting 9 and fill the interstices between the meshed threads, and which is not stiff enough to interfere objectionably with the movements of the float device. I have found that cylinder oil has the qualities needed for this purpose. There is an opening into the chamber 27 from the outside at the top to admit the oil, which opening is normally closed by a screw 28. The oil thus used effectually seals the threaded joint, preventing water from leaking through the joint, and is itself so viscous that it will not flow through this joint, even when the complemental threads are made with no more accuracy than is used in common machine shop practice, while the fluidity of the oil enables it to flow back and forth with the slight axial movements in the swivel joint occasioned by the raising and lowering of the float device.

Not only is the flush valve which I have just described leakage-proof when new, but it is also not liable to become leaky with lapse of time. The swivel joint is, of course, protected by the oil packing against the corrosive effect of acids, salts or alkalies occurring in solution in some waters; and the float device is also made resistant to attack when constructed of a number of pieces of sheet metal soldered together, as here shown, by so forming the soldered joints that access of water to the solder is largely prevented. This is particularly true in regard to the float 12, wherein all joints which are constantly exposed to contact with the water are on the inside, whereby water is excluded from contact with the solder. The float device is likewise light in weight, contains a small amount of material, and is made of but few parts. A comparatively thin gage of sheet metal may be used, and a quality of metal may be selected which is highly resistant to attack by any of the corrosive substances liable to occur in water.

What I claim and desire to secure by Letters Patent is:

1. A flush valve comprising an outlet conduit, a siphon conduit swiveled thereto and adapted to have its suction end raised or lowered, a water-excluding float associated with said siphon conduit and being external thereto, normally holding said suction end raised, and control means for lowering said suction end.

2. The combination with a tank, of a discharge valve consisting of a conduit swiveled at a low point in the tank in a manner permitting its inlet end to be raised and lowered, said conduit discharging to the outside of the tank, and a float connected with said conduit and adapted to hold the same with the inlet end raised when the tank contains water, said inlet end being beside the float.

3. The combination with a tank, of a discharge valve consisting of a conduit swiveled at a low point in the tank in a manner permitting its inlet end to be raised and lowered, said conduit discharging to the outside of the tank, and a float connected with said conduit and adapted to hold the same with the inlet end raised when the tank contains water, said conduit and float being adapted for submergence in the water of the tank whereby to discharge the water, and the conduit being outside the float and having an angle arranged to provide a rising leg from the inlet when so submerged, of which the water content has weight enough to overcome the buoyancy of the float.

4. A watercloset flush valve, comprising a body adapted to pass through a wall of a flush tank, a pipe fitting swiveled to the end of said body, and a combined conduit and float connected to said fitting, the conduit communicating internally with the fitting and extending along one side of the float and at an angle across an adjacent side.

5. A discharge valve, comprising a conduit having fixed and movable sections swiveled together for relative turning movement about a substantially horizontal axis, whereby the movable section may be raised and lowered, and a float connected with said movable section, the inlet part of the movable section being outside of the float and arranged to occupy a substantially upright position when lowered, and having capacity for enough water to overcome the buoyancy of the float.

6. A flush tank outlet valve, comprising a sheet metal structure having a compartment closed at all points to exclude water, and having an angular conduit or passage embracing two sides of said compartment, a fitting connected to one end of said conduit, the other end of the conduit being open, and a fixed conduit section to which said fitting is swiveled on a substantially horizontal axis.

7. The combination with a flush tank of a pipe fitting, passing through a wall thereof and having an open end inside the tank, arranged with its axis substantially horizontal, an elbow fitting swiveled to the open end of said pipe fitting, and a combined conduit and float structure connected to said elbow fitting, the conduit part of said structure having a bend or angle between its ends, and the float part of said structure being contained in the internal angle thereof.

8. A flush tank outlet valve comprising in combination a pipe fitting adapted to be mounted in a tank, a conduit having at one end a swiveled and communicating connection with said pipe fitting arranged to turn about a substantially horizontal axis when the device is operatively mounted, and said conduit being offset to one side at its opposite or inlet end whereby to form a siphon when turned about said axis into lowered position with the inlet end directed downwardly, and a water excluding float attached externally to said conduit.

9. A flush tank outlet valve comprising in combination a pipe fitting adapted to be mounted in a tank, a conduit having at one end a swiveled and communicating connection with said pipe fitting arranged to turn about a substantially horizontal axis when the device is operatively mounted, and said conduit being offset to one side at its opposite or inlet end whereby to form a siphon when turned about said axis into lowered position with the inlet end directed downwardly, and a water excluding float attached externally to said conduit in a position where it projects downward therefrom when the conduit is lowered.

In testimony whereof I have affixed my signature.

CHARLES WILLIAM BEATTIE.